INVENTOR.
DONALD A. CHENNELLS
BY
HIS ATT'YS

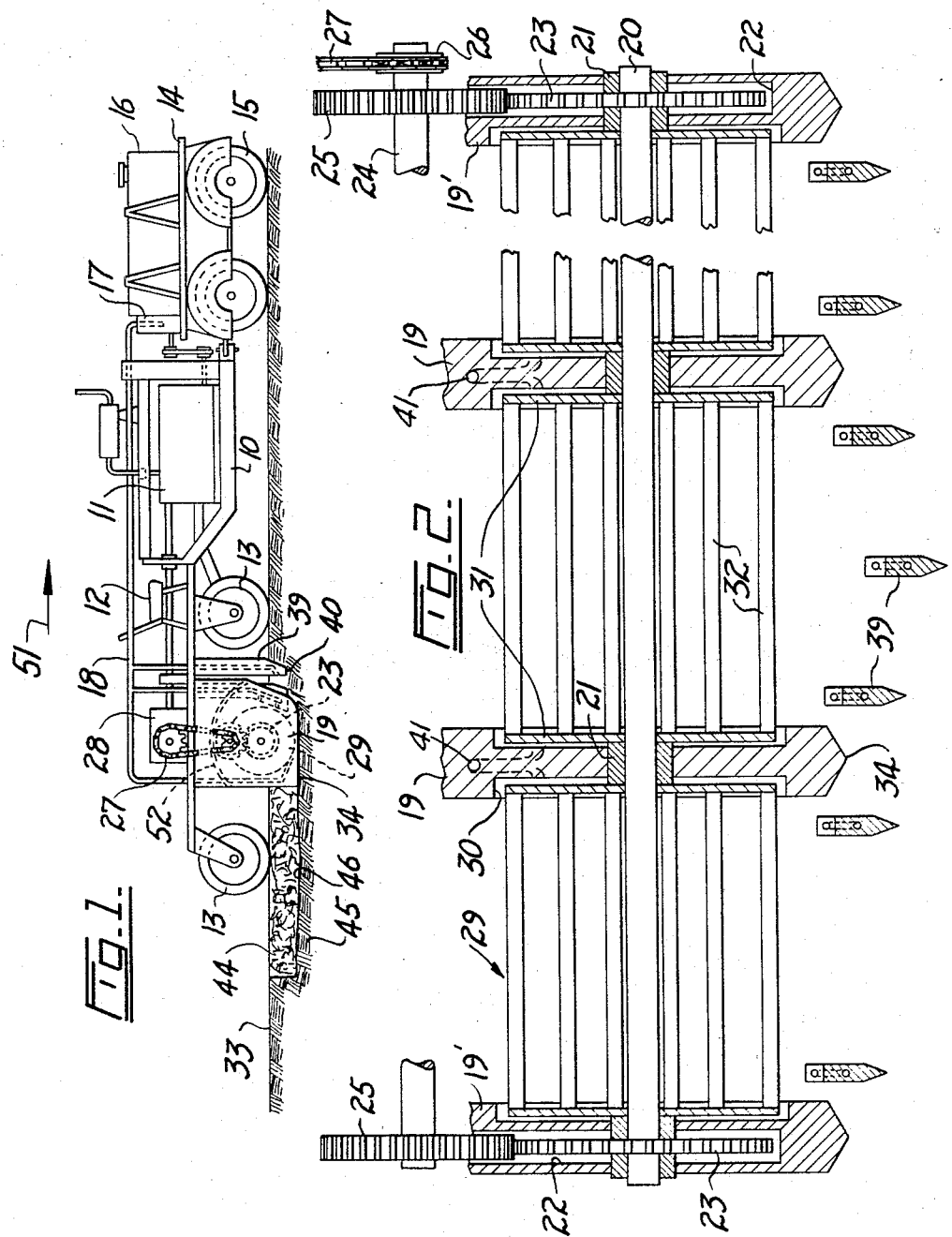

United States Patent Office 3,292,510
Patented Dec. 20, 1966

3,292,510
ROAD SURFACE STABILIZING DEVICE
Donald A. Chennells, 13 Iroquois Bay, Winnipeg, Manitoba, Canada
Filed Nov. 9, 1964, Ser. No. 410,023
2 Claims. (Cl. 94—40)

My device relates to new and useful improvements in devices for stabilizing gumbo and clay surfaces or roads and the like.

Gumbo and clay, when used as a road surface, are not satisfactory due to the fact that they take up relatively large quantities of water thus becoming extremely sticky and slippery and, alternatively, when they are dry they become hard and powdery thus causing a considerable amount of dust and a general breakdown of the road surface.

It is well known that such materials can be stabilized by the incorporation therein of additives. Additives sometimes include heated asphalt, an emulsion of asphalt and water, phosphoric acid (P3HO) in liquid form, powdered dry cement, hydrated lime in powder form, salt ($CaCO_2$), water repellent acids and phosphuric sulphur.

Heated asphalt, emulsion, powdered dry cement and hydrated lime give good results on their own and the other ingredients are often used in combination with one of these four mentioned materials thus improving the action of these materials.

However, the principal difficulty is the incorporation of the additives into the gumbo or clay to form a relatively homogeneous mixture. Attempts have been made in the past to remove the upper six or eight inches of the surface, to pulverize same and incorporate the additive therein, and then spread the resultant mass behind the vehicle but it will be appreciated that the cost involved in the operation and building of the necessary machinery is considerable thus making the process uneconomical for general use.

I have overcome these disadvantages by providing a device which is relatively simple in construction and which can pulverize the gumbo or clay in situ and at the same time inject and mix the necessary stabilizing materials therein without removing the layer from the road surface.

The principal object and essence of my invention is therefore to provide a device of the character herewithin described which can pulverize the clay or gumbo surface and incorporate stabilizing materials therein, without removing the surface before such process.

Another object of my invention is to provide a device of the character herewithin described which can be self propelled or towed fairly rapidly over the surface being stabilized, thus making the stabilization of the surface relatively an economical matter.

Another object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a schematic view of my invention associated with a source of power and showing the relationship between the device and the road surface, said figure being reduced in scale with relation to the remainder of the figures.

FIGURE 2 is a horizontal cross sectional view showing the pulverizing reels, the main shoes and the shoes in advance of the reels and also showing the countershaft and gearing in an offset position.

In the drawings like characters of reference indicate corresponding parts in the different figures.

Figure 3:
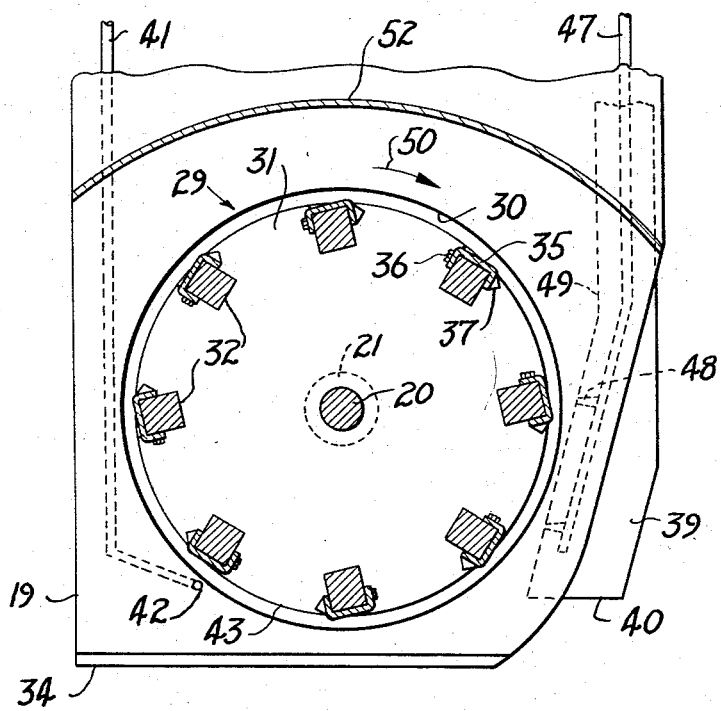
FIGURE 3 is a side elevation of one of the shoes and reels shown in FIGURE 2.

Proceeding therefore to describe my invention in detail, reference should first be made to FIGURE 1 in which 10 illustrates a chassis forming a supporting structure within which is contained a source of power in the form of an engine 11 operated by a driver situated in the location identified by the reference character 12.

This chassis is supported upon ground engaging wheels 13 which are mounted conventionally and the device is propelled by the source of power being connected to the wheels 13 in the normal way.

A trailer or cart 14 is situated in advance of the chassis, said trailer being wheel mounted as indicated by 15, the trailer carrying a tank 16 thereon within which may be stored stabilizing materials being used in the stabilizing of the road surface.

A pump schematically shown at 17 is connected to the source of power 11 and delivers the additive through conduits 18 to locations hereinafter to be described.

My device consists of a plurality of spaced and parallel shoes 19 secured in transversely spaced relation to the supporting structure and depending downwardly therefrom. A drive shaft 20 extends through these shoes and is supported within bearings 21 carried by the shoes, the end shoes specifically designated 19′ being recessed internally as at 22 to carry drive gears 23 secured to the ends of the shaft 20 extending through these shoes 19′.

A counter shaft 24 is supported within the framework above the shoes and gears 25 are secured to the shaft and engage the aforementioned gears 23.

Sprocket 26 is also secured to shaft 24 and is connected by means of chain 27 to a gear box 28 which in turn is connected to the source of power 11.

A set of reel assemblies collectively designated 29 are situated upon the shaft 20 between adjacent pairs of shoes 19, said shoes being recessed in the sides thereof as shown at 30 to receive the ends of the reels 29.

Each of these reels comprises a pair of discs 31 secured to shaft 20, each pair of discs having a plurality of spaced and parallel transversely situated bars 32 extending between the perimetrical edges of the discs.

Reference to FIGURE 1 will show that these reels 29 are situated below the surface 33 of the road being stabilized and adjacent the lower ends 34 of the shoes 19.

Figure 4:
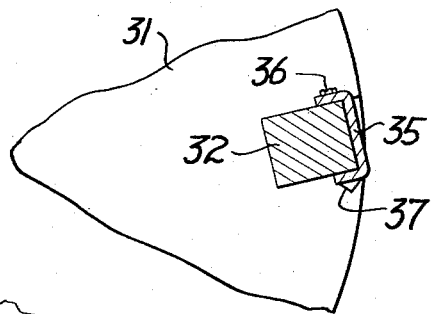
FIGURE 4 is an enlarged fragmentary side view of part of one of the reels showing the inclination of the bars therein.
Figure 5:
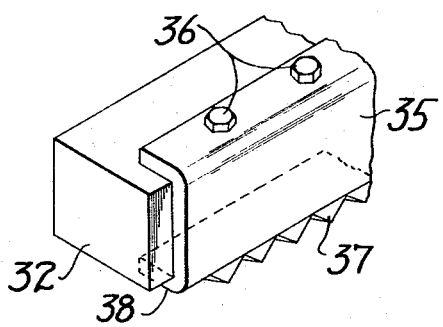
FIGURE 5 is an enlarged fragmentary isometric view of one of the bars showing the detachable teeth secured therein.

Each of the bars 32 is situated between the discs 31 and at a slight angle as clearly illustrated in FIGURE 4. A detachable U-shaped tooth carrier 35 is secured around each bar 32 as illustrated in FIGURE 5, bolts 36 securing the carrier to the bar.

A plurality of wedge shaped cutting teeth 37 are formed upon the leading edge 38 of the carrier to assist in the pulverization of the road surface as the device is rotated thereon.

Also depending downwardly from the supporting structure in spaced and parallel relationship is a plurality of further shoes 39 situated in standard array in advance of the shoes 19 which carry the reels 29 and the lower ends 40 of these shoes are situated adjacent the lower ends 34 of the main shoes 19.

A conduit 41 extends from the main conduit 18 downwardly through each main shoe 19 and then angulates forwardly to discharge nozzles 42 situated adjacent the lower run 43 of the reel assemblies 29. These conduits 41 convey the additive material under pressure from the tank or container 16 to the area immediately below the reels and being pulverized thereby, thus laying down a skin of additive between the pulverized road surface indicated in FIGURE 1 by reference character 44 and the undisturbed portion of the road indicated by the reference character 45, reference character 46 indicating the junction between these two areas.

Further conduits 47 also extend from the main conduit downwardly through each of the secondary shoes 39, said conduits terminating in discharge nozzles 48 within the rear faces 49 of these shoes 39 and adjacent the reels 29 as illustrated in FIGURE 3.

In operation, the reels are rotated by the source of power in the direction of arrow 50 and at a relatively high speed in the neighborhood of 3,000 r.p.m.

The secondary shoes 40 break up the ground as the device moves in the direction of arrow 51 whereupon the portion that has been broken by these shoes is pulverized by the reels 29 following immediately behind.

As this material is pulverized, the additive is injected under pressure through nozzles 42 and 48 and is finely mixed so that the resultant mass is completely homogenized whereupon it is deposited rearwardly of the device as indicated by the reference character 44.

The main shoes 19 assist in breaking the layer further and separating same so that it can be acted upon by the individual reels 29 between the shoes 19.

A semi-circular shield 52 extends over the reels above ground and prevents the reels from throwing the pulverized material upwardly.

Due to the fineness of the pulverization of the material and the intimate mixing therein of the stabilizing compounds, the resultant mass settles behind the machine and may, if desired, be rolled lightly in order to finish the surface and leave same in a level state.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a road surface stabilizing machine, the combination of a wheeled frame adapted to travel over a road surface to be stabilized, a plurality of transversely spaced ground penetrating plate-like shoes secured to and depending from said frame, a driven shaft extending transversely through said shoes, a plurality of reels fixed to said shaft between adjacent pairs of shoes, said reels having transverse mixing blades, a conduit extending downwardly through each of said shoes from a source of stabilizer supply, the conduit in each shoe being disposed rearwardly of said reels and terminating at its lower end in a discharge nozzle directed forwardly toward the lower portion of the reels, a set of seconday ground penetrating shoes secured to and depending from said frame forwardly of and between the first mentioned shoes and in advance of said reels, a conduit extending downwardly through each of said secondary shoes from a source of stabilizer supply and terminating in a discharge nozzle directed rearwardly toward said reels, and means for rotating said shaft and reels.

2. The device as defined in claim 1 together with ground deflecting shields provided between adjacent pairs of the first mentioned shoes above said reels.

References Cited by the Examiner

UNITED STATES PATENTS

| 1,632,969 | 6/1927 | Horner | 94—39.5 X |
| 1,938,023 | 12/1933 | Ingalls | 94—39.5 |
| 2,090,290 | 8/1937 | Gardner | 94—44 |
| 2,394,017 | 2/1946 | Seaman | 94—44 |
| 2,397,782 | 4/1946 | Flynn | 94—40 |
| 2,865,268 | 12/1958 | Gardner | 94—40 |
| 2,885,934 | 5/1959 | Gardner | 94—40 |

JACOB L. NACKENOFF, *Primary Examiner.*